US008020783B2

(12) United States Patent
Backman, Jr.

(10) Patent No.: US 8,020,783 B2
(45) Date of Patent: Sep. 20, 2011

(54) RADIANT MAT GRID

(76) Inventor: James Joseph Backman, Jr., San Diego, CA (US)

( * ) Notice: Subject to any disclaimer, the term of this patent is extended or adjusted under 35 U.S.C. 154(b) by 1097 days.

(21) Appl. No.: 11/879,603

(22) Filed: Jul. 18, 2007

(65) Prior Publication Data

US 2008/0017725 A1    Jan. 24, 2008

Related U.S. Application Data

(60) Provisional application No. 60/831,827, filed on Jul. 19, 2006.

(51) Int. Cl.
*F24D 3/12* (2006.01)
*F24D 3/16* (2006.01)
*E04F 11/16* (2006.01)

(52) U.S. Cl. .................. 237/69; 165/56; 52/177

(58) Field of Classification Search ............ 237/69; 165/193, 49, 69, 56; 52/177
See application file for complete search history.

(56) References Cited

U.S. PATENT DOCUMENTS

| | | | | |
|---|---|---|---|---|
| 2,548,036 A * | 4/1951 | Milborn | ............ | 165/56 |
| 2,840,353 A * | 6/1958 | Muspratt | ............ | 165/56 |
| 3,309,499 A * | 3/1967 | Carr | ............ | 392/407 |
| 3,335,262 A * | 8/1967 | Allen et al. | ............ | 219/474 |
| 4,301,859 A * | 11/1981 | Hollemann | ............ | 165/49 |
| 4,326,366 A * | 4/1982 | Werner | ............ | 52/220.3 |
| 4,338,994 A * | 7/1982 | Hewing et al. | ............ | 165/49 |
| D274,948 S * | 7/1984 | Swanson et al. | ............ | D25/156 |
| 4,508,162 A * | 4/1985 | Radtke | ............ | 165/56 |
| 4,576,221 A * | 3/1986 | Fennesz | ............ | 165/49 |
| 4,584,221 A * | 4/1986 | Kung | ............ | 428/44 |
| 4,640,067 A * | 2/1987 | Hagemann et al. | ............ | 52/220.3 |
| 4,782,889 A | 11/1988 | Bourne | | |
| 4,865,120 A * | 9/1989 | Shiroki | ............ | 165/56 |
| 5,082,712 A * | 1/1992 | Starp | ............ | 428/95 |
| 5,245,805 A * | 9/1993 | Takeda et al. | ............ | 52/126.6 |
| 5,339,581 A * | 8/1994 | Schlickenmeyer | ............ | 52/177 |
| 5,454,428 A | 10/1995 | Pickard | | |
| 5,509,244 A * | 4/1996 | Bentzon | ............ | 52/387 |
| 5,542,603 A | 8/1996 | Macduff | | |
| 5,579,996 A * | 12/1996 | Fiedrich | ............ | 237/69 |
| 5,614,292 A * | 3/1997 | Saylor | ............ | 428/209 |
| 5,743,330 A | 4/1998 | Bilotta | | |
| 5,788,152 A | 8/1998 | Alsberg | | |
| 5,862,854 A * | 1/1999 | Gary | ............ | 165/55 |
| 6,182,903 B1 | 2/2001 | Fiedrich | | |
| 6,270,016 B1 | 8/2001 | Fiedrich | | |
| 6,370,831 B1 * | 4/2002 | Marshall et al. | ............ | 52/263 |
| 6,451,400 B1 * | 9/2002 | Brock et al. | ............ | 428/44 |
| 6,467,224 B1 * | 10/2002 | Bertolini | ............ | 52/177 |
| 6,622,440 B2 * | 9/2003 | Mercade | ............ | 52/177 |
| 6,726,115 B1 * | 4/2004 | Chiles et al. | ............ | 237/69 |
| 6,802,159 B1 * | 10/2004 | Kotler | ............ | 52/177 |
| D499,189 S * | 11/2004 | Collison | ............ | D25/62 |
| 6,935,361 B2 | 8/2005 | Rocheleau | | |
| 7,021,372 B2 * | 4/2006 | Pickard | ............ | 165/168 |
| RE39,097 E * | 5/2006 | Schilham | ............ | 52/263 |
| 7,140,426 B2 * | 11/2006 | Huebner et al. | ............ | 165/170 |
| 7,185,610 B2 * | 3/2007 | Romeu Guardia | ............ | 119/448 |
| 7,587,865 B2 * | 9/2009 | Moller, Jr. | ............ | 52/181 |
| 7,594,365 B2 * | 9/2009 | Kang et al. | ............ | 52/220.2 |
| 7,698,859 B2 * | 4/2010 | Sansano Marti | ............ | 52/177 |

(Continued)

*Primary Examiner* — Steven B McAllister
*Assistant Examiner* — Phillip E Decker
(74) *Attorney, Agent, or Firm* — Harry V. McGahey, Jr.; McGahey & McGahey, APLC

(57) ABSTRACT

An improved apparatus and method of attaching heated or cooled liquid filled tubing to a floor, wall or ceiling to create a radiant heating or cooling system.

8 Claims, 9 Drawing Sheets

U.S. PATENT DOCUMENTS

| | | |
|---|---|---|
| 7,748,177 B2 * | 7/2010 | Jenkins et al. ............. 52/177 |
| 2003/0061772 A1 * | 4/2003 | Bertolini ..................... 52/98 |
| 2003/0089051 A1 * | 5/2003 | Bertolini ..................... 52/177 |
| 2003/0218075 A1 | 11/2003 | Muir |
| 2004/0026525 A1 | 2/2004 | Fiedrich |
| 2004/0256479 A1 | 12/2004 | Meirana |
| 2005/0252109 A1 * | 11/2005 | Fuccella et al. ............. 52/177 |
| 2005/0258264 A1 | 11/2005 | Simensen |
| 2006/0000578 A1 * | 1/2006 | Kang et al. ................. 165/56 |
| 2006/0070314 A1 * | 4/2006 | Jenkins et al. ............. 52/177 |
| 2008/0005988 A1 * | 1/2008 | Dombowsky ............... 52/314 |
| 2009/0026192 A1 * | 1/2009 | Fuhrman .................... 219/523 |

* cited by examiner

RADIANT MAT GRID

CROSS-REFERENCE TO RELATED APPLICATIONS

This application is entitled to the priority filing date of it's underlying Provisional Patent Application No. 60/831,827 for Radiant Mat Grid filed with the U.S. Patent Office on Jul. 19, 2006.

STATEMENT REGARDING FEDERALLY SPONSORED RESEARCH FOR DEVELOPMENT

No Federal Funds were used in the development of this Invention.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

Radiant floor heating systems have been in use commercially and in residential structures since the Roman Times. Low temperature radiant panels are the most effective method of heating and cooling transfer known. The Radiant Panel Association claims 20% to 40% more efficiency in a heating application than forced air type heating. Radiant heating and cooling is completely clean and silent with no dust, allergens or pollutants blowing around the structure. Radiant heating and cooling offers complete interior design flexibility as there are no ducts or registers to accommodate. Frank Lloyd Wright and others designed many in the early twentieth century using copper tubing and iron piping. But with the development of Molecularly Cross-Linked Poly Ethylene tubing (PEX), such heating methods became more affordable, reliable and easier to install for use by the general public. This present invention is both an improved apparatus and method for installation of radiant heating and cooling systems.

FIELD OF THE INVENTION

Radiant Floor Heating and Cooling Apparatus and Methods.

DESCRIPTION OF RELATED ART

Current radiant heating and cooling systems employ various methods to anchor the liquid filled tubes or electric heating cables necessary to create an array of hydronic radiant panels when they are built into the floors, wall and ceilings of living and work spaces. Current systems have the following disadvantages:

1) The tubes are not held securely and therefore they tend to pop out of their matrix or mat during the overpouring;

2) When Polystyrene or other foam based tube holding matrices are used, the entire system is up to three times as thick as the present invention;

3) Current systems use knobs or integrated insulation systems which inhibit heat transfer and are less efficient;

4) Prior systems are prone to damage during the overpour process. The present invention is much less prone to damage prior to and during the overpour.

5) Current systems are not as modular and require more cutting and waste;

6) Current systems do not lock together as effectively or completely and the current invention is able to allow pre-staging of larger sheets of mats or grids then other existing systems;

7) Current systems do not lay as flat and uniform as the present invention;

8) Current systems do not bear weight as effectively as the present invention;

9) Current systems constructed of vacuum formed or heat stamped polystyrene or other similar materials have little inherent structural integrity, do not lay as flat, and tend to create an insulated knob, thereby inhibiting lateral heat transfer;

10) Current systems do not have a recessed anchor point to accept and guide a screw or other fastening device to anchor the mat to the floor, walls or ceiling;

11) Current systems do not have a recessed anchor point to accept and guide into place a top layer constructed of cement board, wood, cellulose, plastic composite, aluminum, copper or other structural and heat diffusion aiding material creating an integrated modular system that can be completely installed, uninstalled, and then re-assembled;

12) Current systems do not allow for the addition of a combination top layer comprised of an anti-fatigue mat, a shop floor, and/or transition ramps to a concrete shop floor for use in modular industrial applications.

13) Current systems do not allow for the overpour material to penetrate the attaching knob and consequently do not add any structural benefits to the overpour situation or aid in heat transfer.

14) Current systems do not allow for the integration of finish floor products made of wood, tile, stone, linoleum, metal, etc.

There is currently no relevant art which has all the advantages of the current invention. U.S. Patent application #20040026525 describes a radiant heating system using tubing embedded in gypsum or cement board. The current invention has improved heat transfer characteristics over that invention because it has the ability to use tubing in contact with aluminum or other radiant temperature conducting material attached to the cement board thereby sandwiching the tube between the cement board and the radiant mat.

Other examples of relevant art include U.S. Pat. Nos. 6,182,903; 6,270,016; 6,726,115; 5,788,152; 5,743,330; 5,542,603; 5,454,428; 4,782,889; 5,097,893 and 6,935,361.

BRIEF SUMMARY OF THE INVENTION

The invention described herein is an improved method of attaching heated or cooled liquid filled molecularly crossed linked polyethylene tubing other tubing or electrical heating cables to a floor, wall or ceiling to create a heating or cooling radiant panel. The invention described herein in one of it's preferred embodiments allows for a complete modular system that can be disassembled and reassembled at will.

The Radiant Mat Grid matrix in a floor heating or cooling embodiment is generally installed over an insulating and/or reflective layer. In a radiant wall or ceiling embodiment the insulating/reflective layer is generally accomplished by bat type insulation in the wall/ceiling space behind the radiant panel.

In a raised floor installation the bat insulation is installed in between the floor joists under the sub-floor. In a preferred embodiment the insulating/reflective layer is formed of vacuum formed or heat stamped polystyrene or other material and when inserted into the bottom of the Mat Grid sandwiching a reflective layer of aluminum, Mylar or other reflective material creates an integrated tube installation and insulation solution.

DETAILED DESCRIPTION OF THE SEVERAL VIEWS OF THE DRAWINGS

Figure 1:
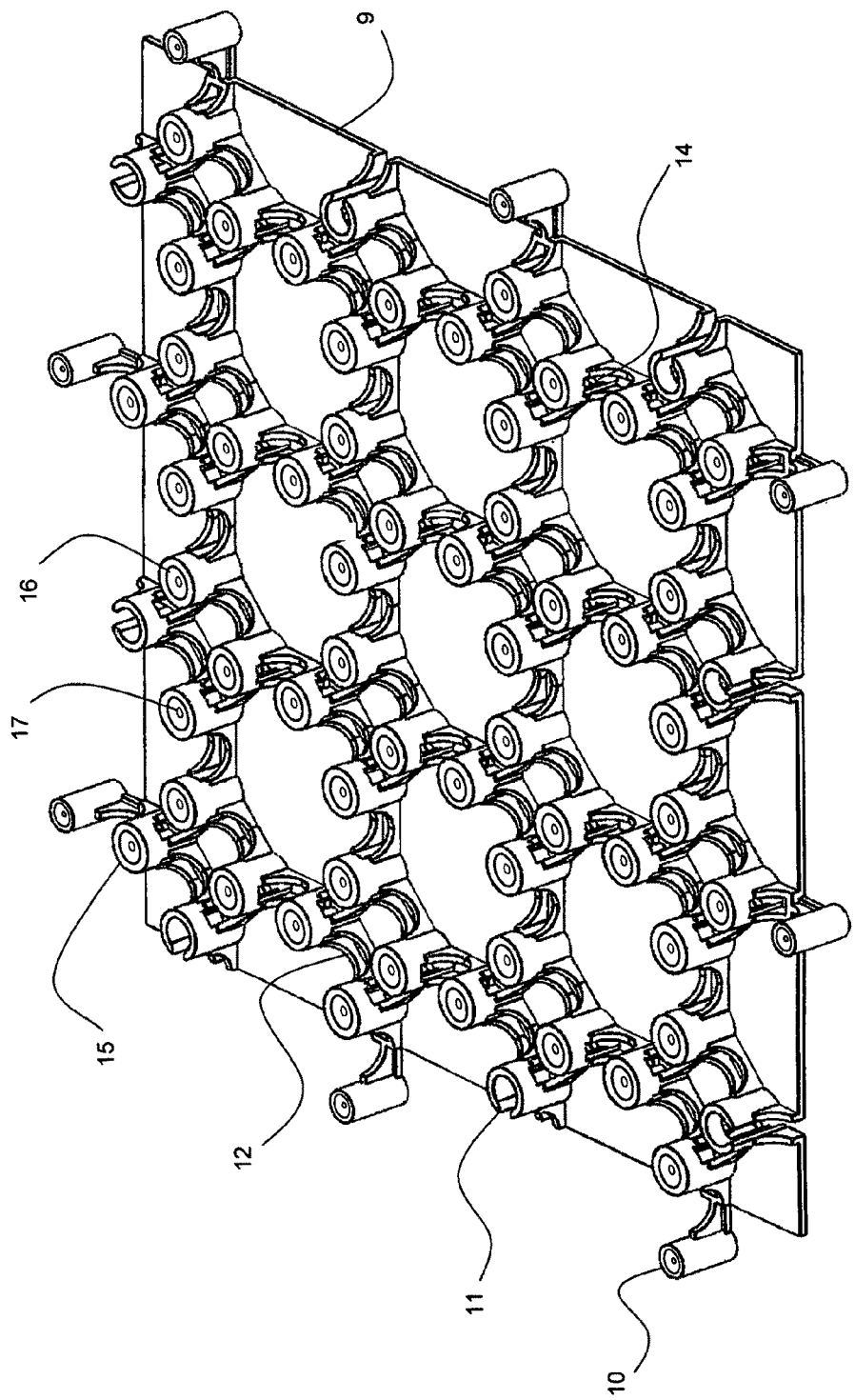
FIG. 1 shows a top orthogonal view of a single radiant Mat Grid by itself.

FIG. 1 is an orthogonal view of the preferred embodiment shape which is comprised of a single radiant Mat Grid tile (9) having and upper surface and a lower surface. There are a plurality of protuberances (10) extending beyond the perimeter of the radiant Mat Grid (9) around its circumference. Each protuberance or male knob (10) can snap securely into a corresponding protuberance receptacle or female knob (11) placed along the interior of the circumference of the tile. Each separate tile is snapped together with other tiles creating a monolithic Radiant Mat Grid matrix. The interior of each tile contains a plurality of weight bearing support knobs (15) on its upper surface. Each weight bearing support knob (15) has a recess at the upper end (16) and a screw guide opening (17) together comprising a screw recess unit. Each weight bearing support knob (15) can be used to mate with an additional top layer. A screw or other fastener means can be inserted through each screw guide unit via the screw guide hole (17) inside each weight bearing support knob (15) to attach the radiant Mat Grid tile to the underlying surface or sub-flooring leaving the screw head or other attachment means below the recess (16). The upper surface of each tile contains a plurality of tube cradles (12). Each tube cradle (12) is next to one or more weight bearing support knobs. Each weight bearing support knob (15) adjacent to a tube cradle (12) having an indented undercut notch in its surface on each side (14) adjacent to each tube cradle so as to allow tubing to snap into each tube cradle (12) thereby creating a truss to stiffen the radiant Mat Grid tile (9), limiting lateral flex. In the preferred embodiment the tile is square but any polygonal shape can be used.

Figure 2:
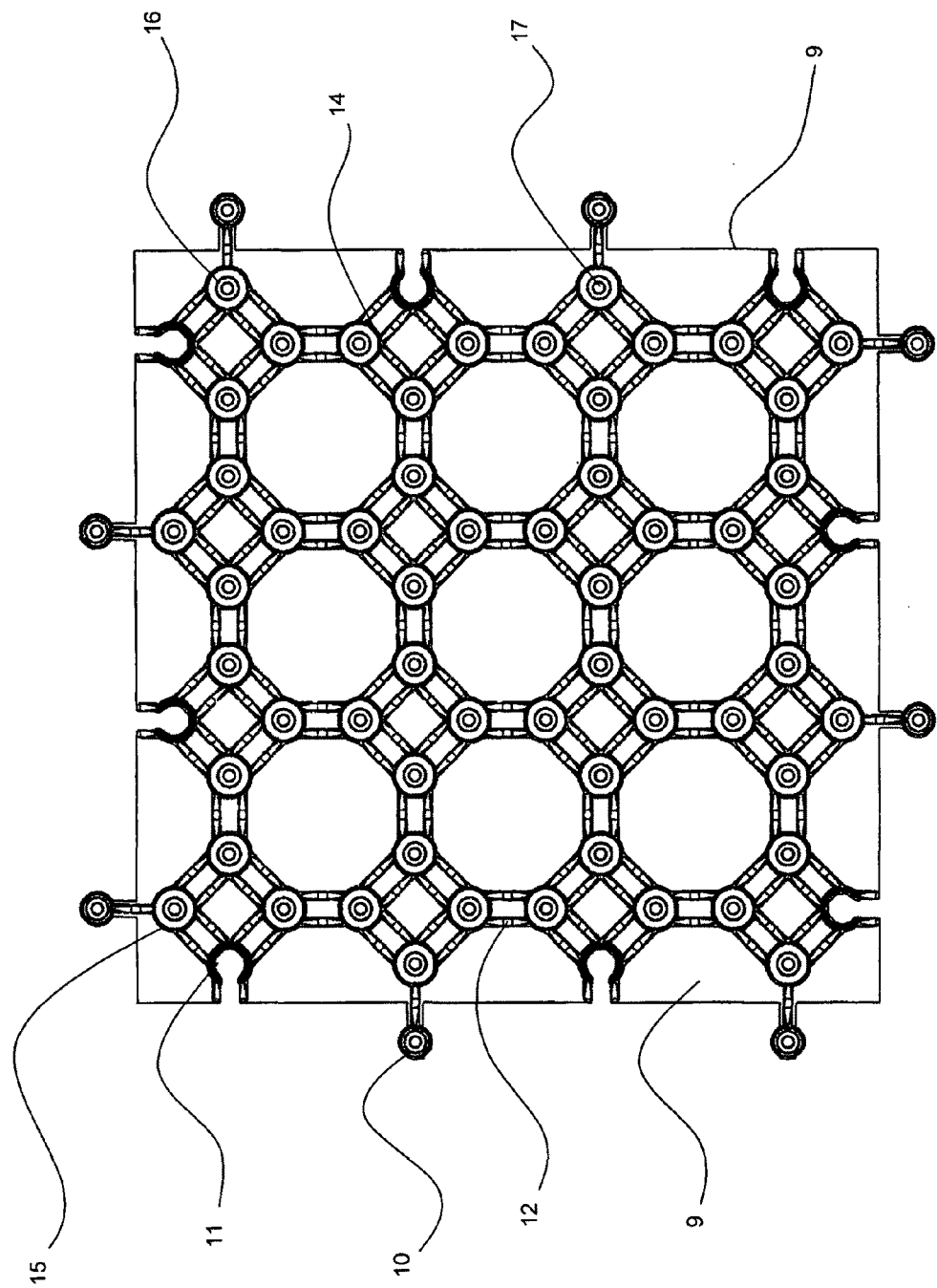
FIG. 2 shows a top view of a single radiant Mat Grid by itself.

FIG. 2 is a similar top view of a single radiant Mat Grid tile (9) similar to the view shown in FIG. 1 with the male knobs (10) extending beyond the perimeter of the radiant Mat Grid (9) around its circumference. Each male knob (10) can snap securely into a corresponding female knob (11) creating a monolithic radiant Mat Grid (9) matrix. Each weight bearing support knob (15) has a recess (16) and a screw guide hole (17) where the recess (16) can mate with an additional top layer and a screw or other fastener means can attach the radiant Mat Grid through the weight bearing support knob (15) via the screw guide hole (17) leaving the screw head or other attachment means below the recess (16). Each tube cradle (12) can guide a heating/cooling tube into the undercuts (14) to allow the tubing to snap in the radiant Mat Grid (9) thereby creating a truss to stiffen the radiant Mat Grid (9), limiting lateral flex.

Figure 3:
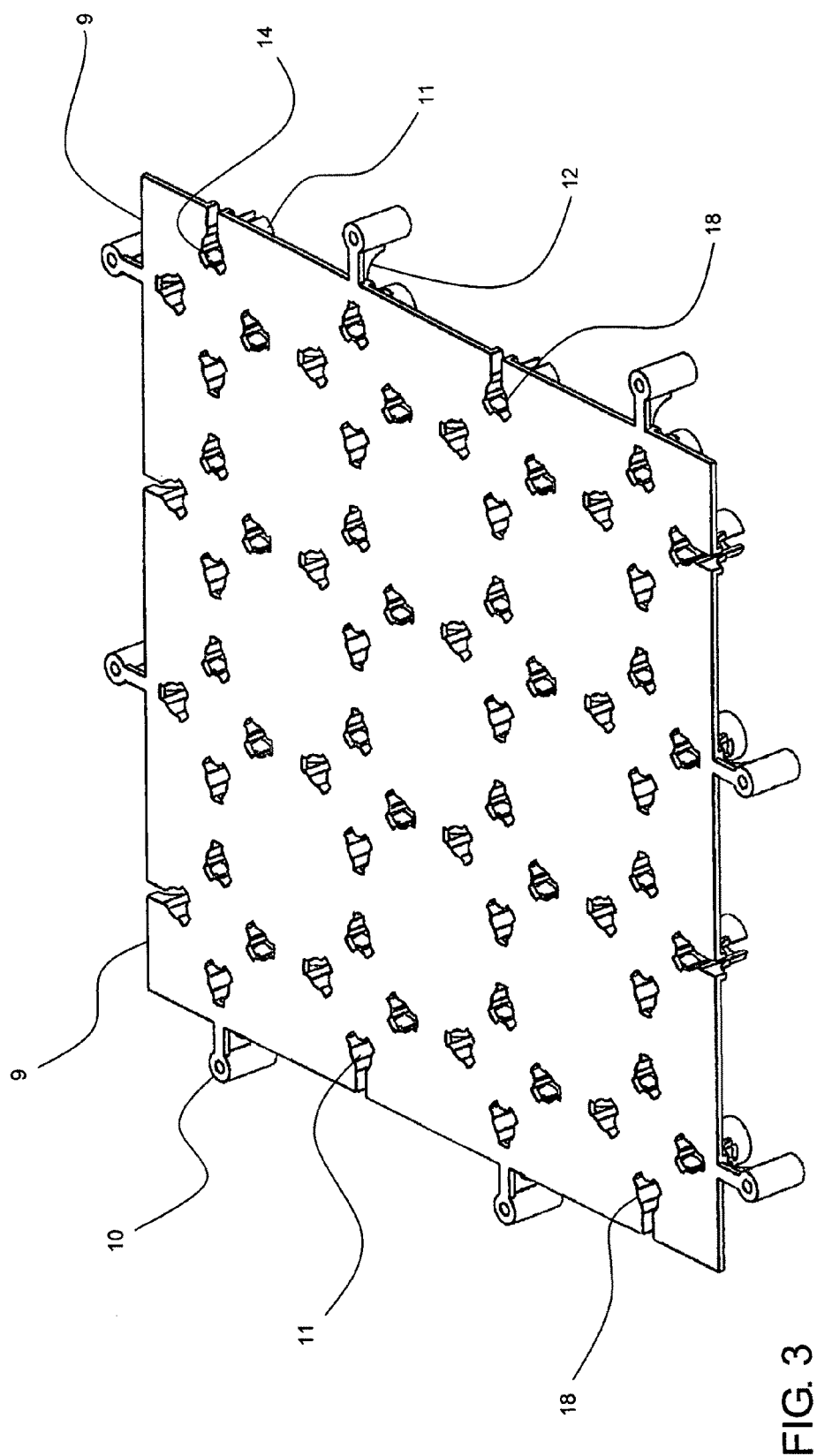
FIG. 3 shows a bottom orthogonal view of a single radiant Mat Grid by itself.

FIG. 3 is a bottom orthogonal view of a single radiant Mat Grid tile (9) with the male knobs (10) extending beyond the perimeter of the radiant Mat Grid (9) around its circumference. Each male knob (10) snaps securely into a corresponding female knob (11) creating a monolithic radiant Mat Grid (9) matrix. The undercut (14) that allows for tubing adhesion is created by a void (18) which can be seen from the bottom of the radiant Mat Grid (9).

Figure 4:
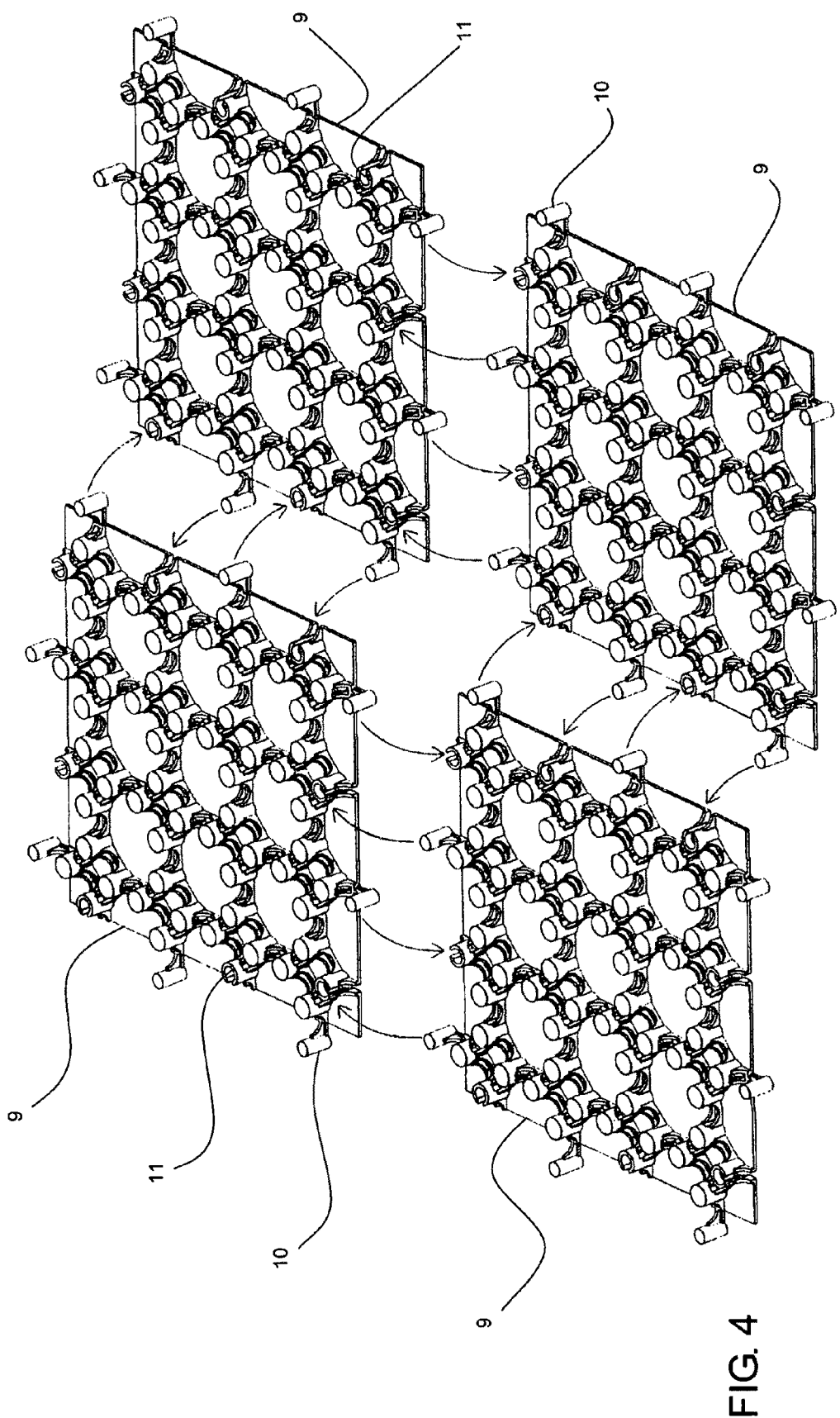
FIG. 4 shows how the radiant Mat Grid snaps together to form a radiant Mat Grid matrix.

FIG. 4 is an orthogonal view of four radiant Mat Grid tiles (9) showing how the male knobs (10) snap into the female knobs (11) simultaneously to create a radiant Mat Grid matrix.

Figure 5:
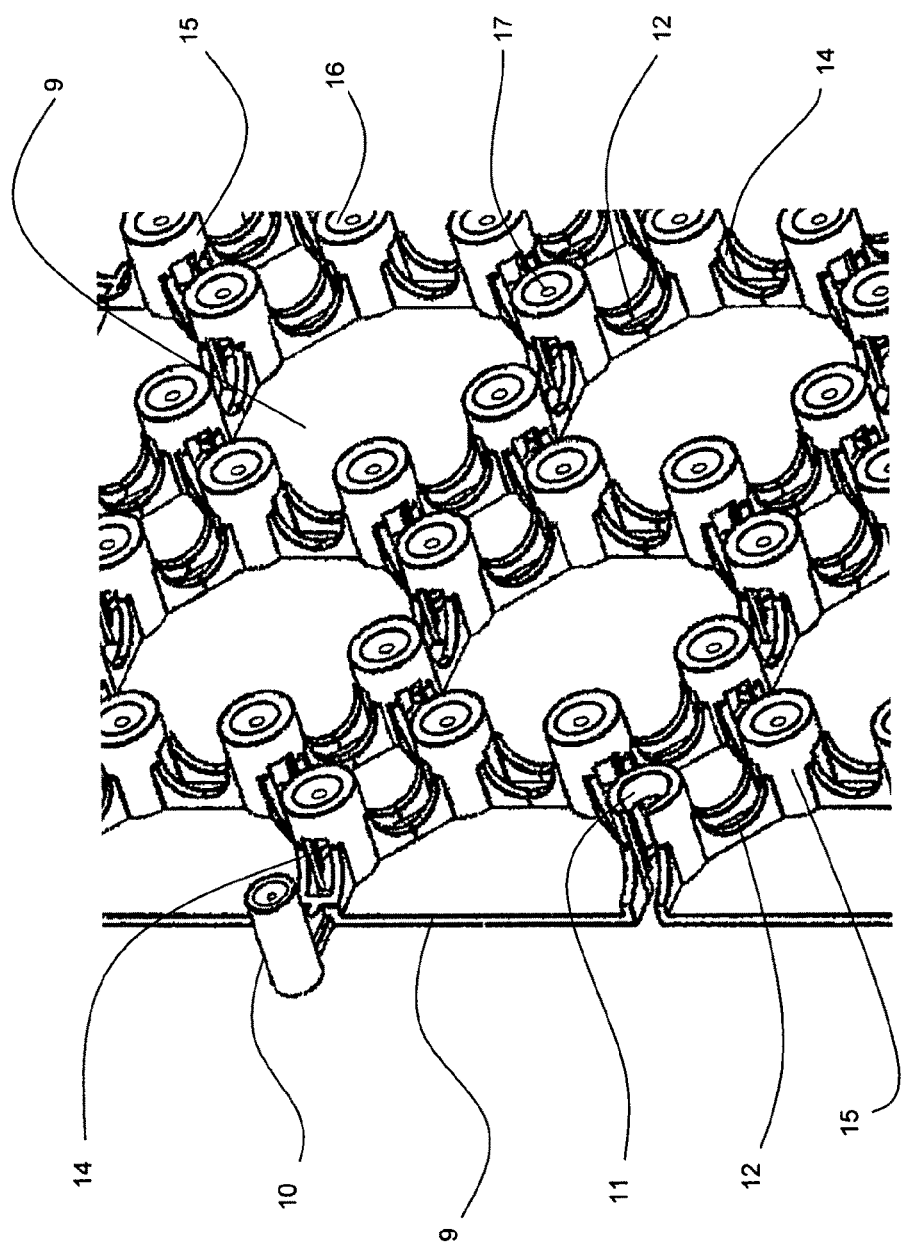
FIG. 5 shows a close-up top orthogonal view detailing the undercut tubing adhesion method.

FIG. 5 is a close-up orthogonal view of a radiant Mat Grid tile (9) that shows one of the undercuts (14) that is created by the void (18) visible from the bottom of the radiant Mat Grid (9) between the tube cradle/trusses. The void (18) allows the thermal mass infill material (over-pour) to penetrate the knob (15) completely. The undercut (14) creates a superior tube adhesion method while allowing the weight bearing knob (15) to remain very strong and crush resistant.

Figure 6:
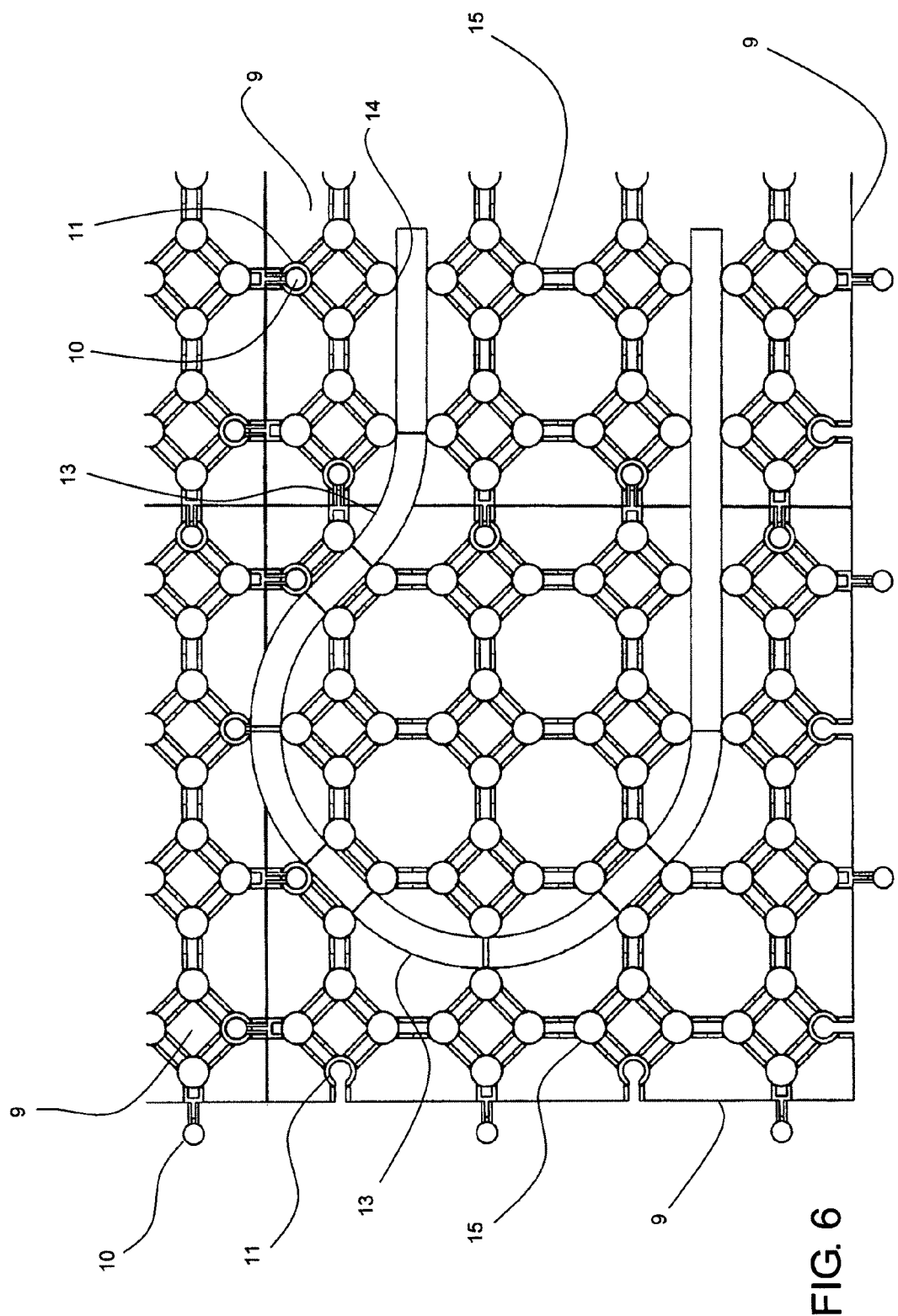
FIG. 6 shows a top view of a single radiant Mat Grid by itself with tubing snapped into it.

FIG. 6 is a top view of a portion of a radiant Mat Grid tile (9) matrix that shows a male knob (10) snapped securely into the female knob (11) to create a radiant Mat Grid matrix. A heating or cooling tube (13) is snapped into the radiant Mat Grid (9) tiles forming the matrix along a cradle/truss (12) path which is then held securely by the undercuts (14) created by the voids (18).

Figure 7:
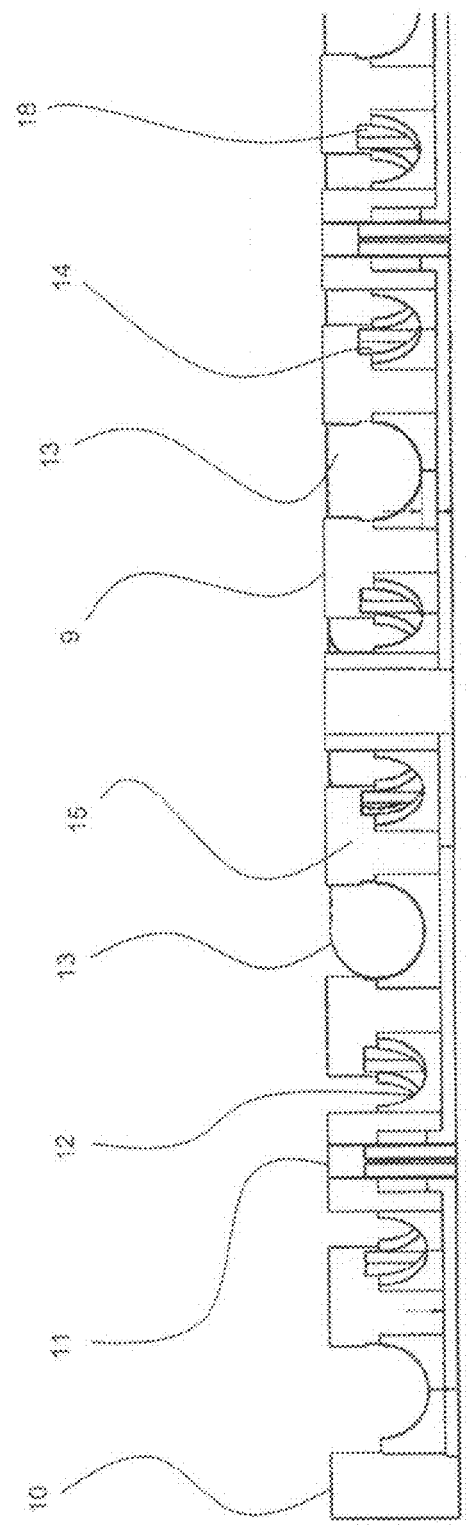
FIG. 7 shows a side view of a single radiant Mat Grid with tubing snapped into it.

FIG. 7 is a close-up side view of a heating or cooling tube (13) snapped into a radiant Mat Grid tile (9) being held securely between each adjacent weight bearing knob (15) by an undercut (14) created by a void (18) which also allows for the infill material (over-pour) to completely penetrate the weight bearing knob (15) thereby allowing for optimum lateral heat diffusion and structural integrity characteristics.

Figure 8:
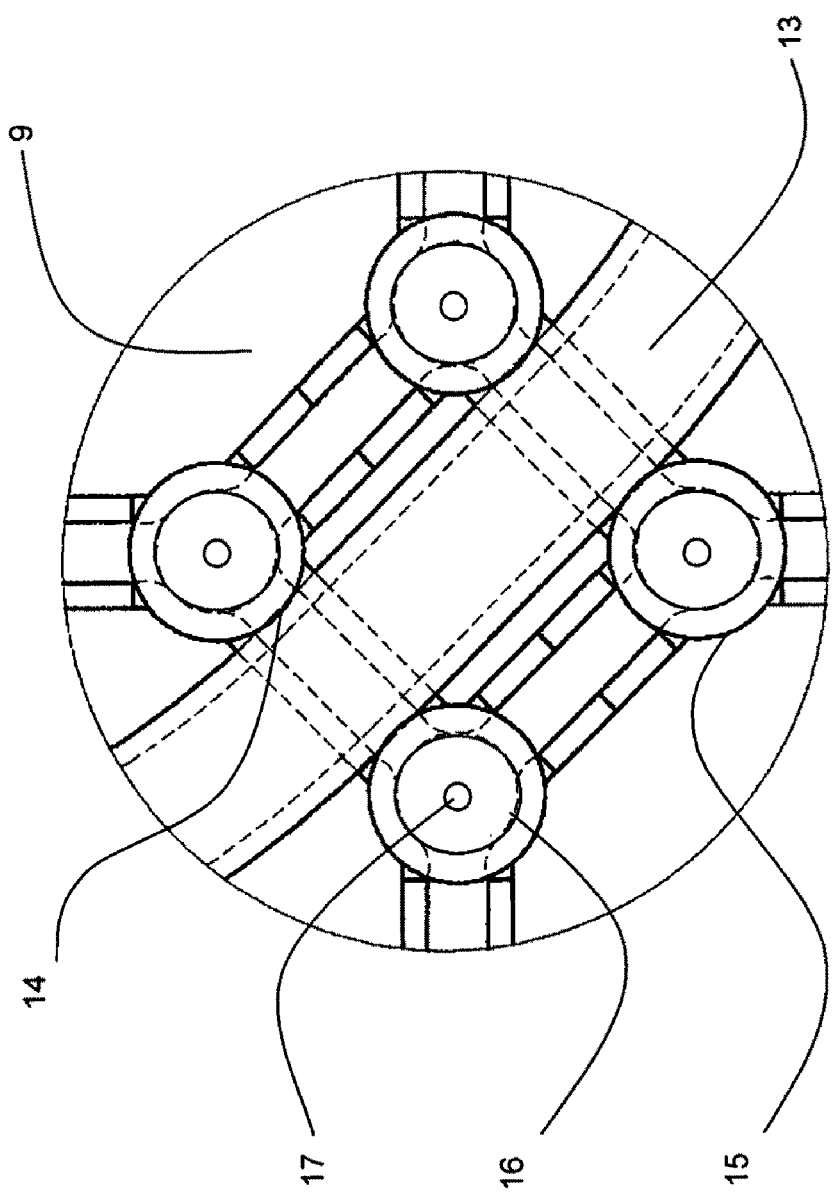
FIG. 8 shows a close-up top view of tubing snapped into a section of radiant Mat Grid.

FIG. 8 is a close-up top view of a heating or cooling tube (13) snapped into a radiant Mat Grid tile (9) along a cradle/truss (12) pathway. A recess (16) and a screw guide (17) are also shown.

Figure 9:
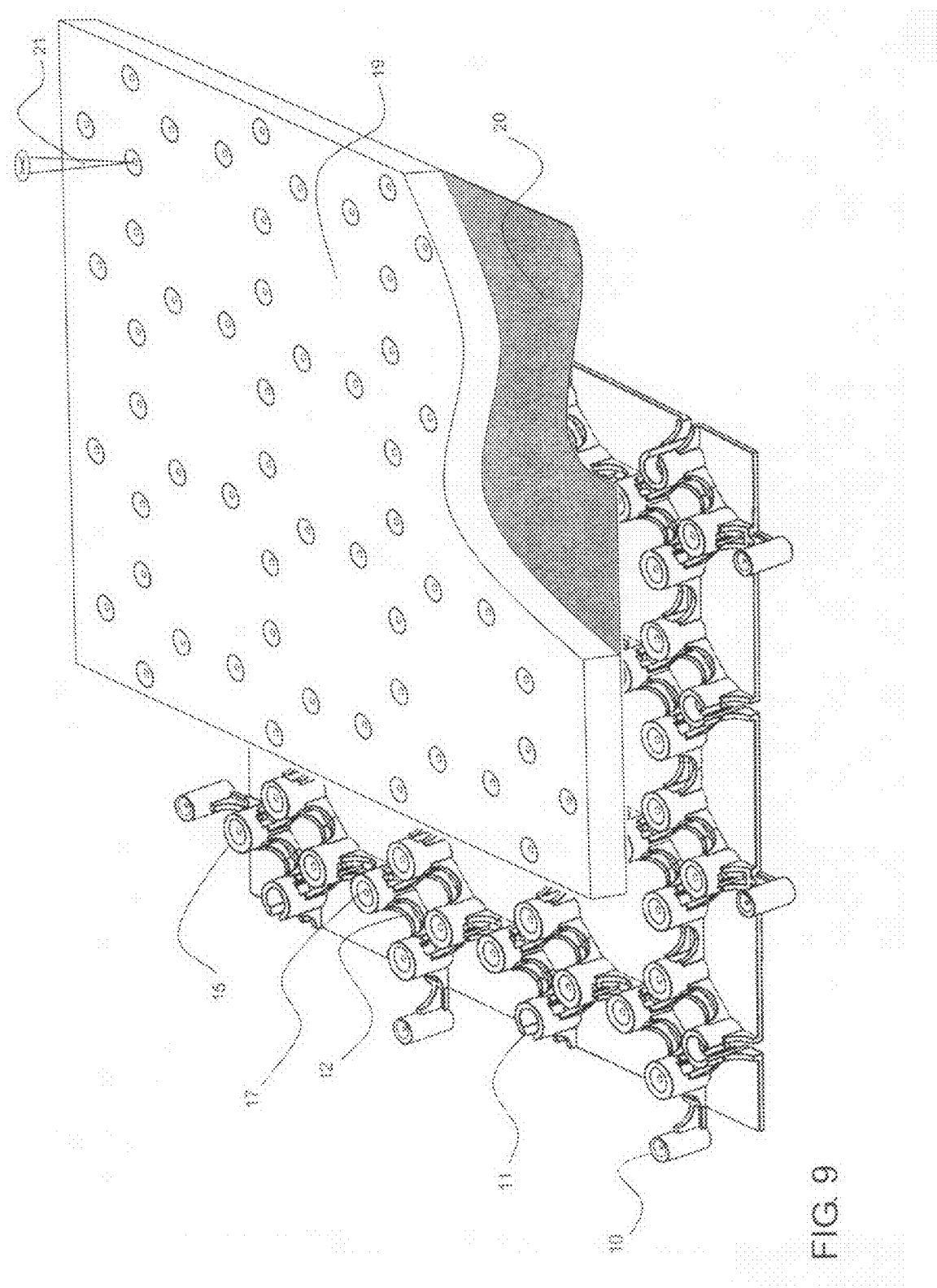
FIG. 9 shows an orthogonal view of the radiant Mat Grid attachment guide

FIG. 9 is an orthogonal view of the radiant Mat Grid (9) with the structural and possibly finished floor layer (19) with heat diffusion aiding material (20) secured to the knob (15) with a screw, barb or other (21) into the screw guide (17) to give a sub-floor or finished floor surface.

DETAILED DESCRIPTION OF THE INVENTION

A single radiant Mat Grid tile (9) has an upper surface and a lower surface. There are a plurality of protuberances (10) extending beyond the perimeter of the radiant Mat Grid (9) around its circumference. Each protuberance or male knob (10) can snap securely into a corresponding protuberance receptacle or female knob (11) placed along the interior of the circumference of a neighboring tile. Each separate tile is snapped together with other tiles creating a monolithic Radiant Mat Grid matrix. The interior of each tile contains a plurality of weight bearing support knobs (15) on its upper surface. Each weight bearing support knob (15) has a recess at the upper end (16) and a screw guide opening (17) together comprising a screw recess unit. Each weight bearing support knob (15) can be used to mate with an additional top layer. A screw or other fastener means can be inserted through each screw guide unit via the screw guide hole (17) inside each weight bearing support knob (15) to attach the radiant Mat Grid tile to the underlying surface or sub-flooring leaving the screw head or other attachment means below the recess (16). The upper surface of each tile contains a plurality of tube cradles (12). Each tube cradle (12) is next to one or more weight bearing support knobs. Each weight bearing support knob (15) adjacent to a tube cradle (12) having an indented undercut notch in its surface on each side (14) adjacent to each tube cradle so as to allow tubing to snap into each tube cradle (12) thereby creating a truss to stiffen the radiant Mat Grid tile (9), limiting lateral flex. In the preferred embodiment the tile is square but any polygonal shape can be used.

The desired plurality of Radiant Mat Grid tiles (9) are placed on the floor, ceiling, roof and/or walls, and the multiple radiant Mat Grid (9) tiles are then snapped together along their perimeter by inserting the male knobs (10) into the adjacent female knobs (11) by stepping on, or otherwise forcing the mating of the male and female knobs along the perimeter of each Radiant Mat Grid tile (9) to create a contiguous matrix covering the desired portion of the floor, wall or ceiling area to be radiantly heated or cooled.

After the desired entire floor, wall or ceiling area to be radiantly heated or cooled is covered by the matrix a tube installation layout is configured and can be marked on the Mat Grid surface. The tubing is then snapped into the matrix along the cradle and tube guides (12) and held securely in place by the undercuts (14) in the knobs (15).

After the tubing is installed the individual Radiant Mat Grid tiles (9) can be secured to the sub-surface by inserting a screw or other attachment means through the knobs (15) which each contain a screw guide (17). The head, nail or any protruding portion of the attachment means can be kept flush with the surface of the knobs because of the recess (16) at the top of each knob (15).

After the tubing is installed and tied into a heating and/or cooling manifold it is then pressure tested for leaks. Next matrix with the tubing installed receives an overpour of concrete, gypcrete, mortar float or other over-pour material, thereby creating the completed radiant heating/cooling panel. After appropriate cooling or setting of the pour-over material, the system is ready to be operated once the heating and cooling systems connected to the manifold are operational.

In another preferred embodiment the Radiant Mat Grid tile matrix is installed as described previously on the floor, wall or ceiling, but instead of sealing it with a pour-over process as previously described, the Radiant Mat Grid matrix is then mated to an upper surface comprised of an efficient heat diffusion material such as cement board, wood cellulose plastic composite board, gypsum board, plywood or similar material which can be integrated with aluminum, copper, ceramics or other efficient heat diffusion material to create a lateral heat diffusion and thermal mass layer. This upper surface may have dimples or recesses on the bottom of it which mate to the knobs (15) and seat into the recesses (16) of the underlying Radiant Mat Grid tiles. This upper surface sits in intimate contact with the tubing (13) to give extremely effective heat or cooling transfer. A screw, nail, barb or other similar attachment means can be used to attach the upper surface to the Radiant Mat Grid (9) through any available screw guides (17) in knobs extending from the upper surface of Radiant Mat Grid tiles which have not already been used to attach the Radiant Mat Grid tile matrix to the underlying floor, wall or ceiling to which it is affixed.

In another embodiment, the screw or other attachment means anchoring the top surface to the Mat Grid can also be used to penetrate through the Mat Grid (9) itself into the underlying surface or sub-flooring itself. A wall or ceiling installation can be given a finished decorative surface or it can be finished by taping, floating and sanding of a typical exterior wall covering such as cement board or gypsum board in accordance with standard construction methods.

In a floor installation, the top surface can be an integrated finished surface or after installation of the top layer it can receive tile, stone, hardwood, carpet etc. in accordance with standard construction methods. This embodiment of the matrix formed by the Radiant Mat tiles creates a modular system which has the advantage of being able to be un-assembled and re-assembled more than once if necessary.

Although the present invention has been described in considerable detail with reference to certain preferred versions thereof, other versions are possible. Therefore the spirit and scope of the appended claims should not be limited to the description of the preferred versions contained therein. All the features disclosed in this specification (including any accompanying claims, abstracts, and drawings) may be replaced by alternative features serving the same, equivalent or similar purposes, unless expressly stated otherwise. Thus, unless expressly stated otherwise, each feature disclosed is one example only of a generic series of equivalent or similar features.

I claim:

1. An apparatus for heating or cooling structures comprised of:
   (a) a plurality of radiant mat grid tiles forming a contiguous matrix of radiant mat grid tiles, each tile being square shaped with an upper surface and a lower surface;
   (b) each tile having a plurality of protuberances affixed to the perimeter of each respective tile;
   (c) each protuberance affixed by an attachment means for anchoring the protuberance to its respective tile so that each protuberance extends outside the perimeter of the tile;
   (d) each tile also having a plurality of protuberance receptacles placed along the interior of the circumference of the tile juxtaposed in a position such that each can lock onto the protuberance of a neighboring tile;
   (e) each tile having a plurality of weight bearing support knobs on its upper surface;
   (f) each weight bearing support knob having a recess at the upper end;
   (g) each recess containing a screw guide opening in its center;
   (h) each tile having a plurality of tube cradles protruding vertically from the upper surface of the tile to support tubing;
   (i) each tube cradle being immediately adjacent to one or more weight bearing support knobs;
   (j) each weight bearing support knob adjacent to a tube cradle having an indented undercut notch in its vertical surface on each side adjacent to each tube cradle so as to allow tubing to snap into each tube cradle and hold the tubing in place;
   (k) the contiguous matrix of radiant mat grid tiles for covering a desired part of the floors, walls, sides or ceiling of a structure to be heated or cooled;

(l) a length of tubing inserted into a plurality of tube cradles on each tile comprising the matrix of radiant mat grid tiles;

(m) the tubing being snapped into the indented undercut notch in the vertical surface of each weight bearing support knob adjacent to each tube cradle the tubing is placed on;

(n) the tubing connected to a pumping manifold means for pumping a liquid to enable the circulation of a heated or cooled liquid through the tubing;

(o) the matrix of tiles covered with an over-pour material.

2. The apparatus in claim 1 wherein the over-pour material is instead covered by an upper surface comprised of an efficient heat diffusion material.

3. The apparatus in claim 2 wherein the upper surface comprised of an efficient heat diffusion material contains dimples and recesses on its bottom surface which mate to the knobs and seat into the recesses of the underlying radiant mat grid tiles.

4. The apparatus in claim 2 wherein the efficient heat diffusion material comprising the upper surface placed over the radiant mat grid tiles is affixed to the radiant mat grid tiles by an attachment means for affixing them extending through a plurality of available screw guides in knobs extending from the upper surface of radiant mat grid tiles which have not already been used to attach the radiant mat grid tiles themselves to the underlying surface to which the radiant mat grid tiles are affixed.

5. The apparatus in claim 2 wherein the attachment means for anchoring the efficient heat diffusion material comprising the upper surface placed over the radiant mat grid tile is also used to penetrate through the same screw guide units used to anchor the radiant mat grid tile itself onto the underlying surface to which the Radiant Mat Grid tiles are affixed.

6. The apparatus in claim 2 wherein the radiant mat grid tiles comprising the matrix can be un-assembled and re-assembled as necessary.

7. The apparatus in claim 1 wherein each tile is of a polygonal shape.

8. The apparatus in claim 2 wherein each tile is of a polygonal shape.

* * * * *